United States Patent
Ramle et al.

(10) Patent No.: US 12,170,955 B2
(45) Date of Patent: Dec. 17, 2024

(54) NETWORK SLICE CONFIGURATION UPDATE

(71) Applicant: Telefonaktiebolaget LM Ericsson (publ), Stockholm (SE)

(72) Inventors: Peter Ramle, Mölnlycke (SE); Kaj Johansson, Gothenburg (SE); Peter Hedman, Helsingborg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 122 days.

(21) Appl. No.: 17/845,312

(22) Filed: Jun. 21, 2022

(65) Prior Publication Data

US 2022/0394607 A1    Dec. 8, 2022

Related U.S. Application Data

(63) Continuation of application No. 16/346,445, filed as application No. PCT/EP2019/059362 on Apr. 12, 2019, now Pat. No. 11,388,661.

(60) Provisional application No. 62/657,754, filed on Apr. 14, 2018.

(51) Int. Cl.
  *H04W 48/18* (2009.01)
  *H04W 60/04* (2009.01)
  *H04W 84/04* (2009.01)

(52) U.S. Cl.
  CPC ........... *H04W 48/18* (2013.01); *H04W 60/04* (2013.01); *H04W 84/042* (2013.01)

(58) Field of Classification Search
  CPC ... H04W 48/18; H04W 60/04; H04W 84/042; H04L 41/0806; H04L 41/082; H04L 41/0895; H04L 41/0897
  USPC ........................................................ 370/329
  See application file for complete search history.

(56) References Cited

U.S. PATENT DOCUMENTS

| | | | |
|---|---|---|---|
| 2010/0167755 A1 | 7/2010 | Kim et al. | |
| 2017/0070892 A1 | 3/2017 | Song et al. | |
| 2018/0270666 A1 | 9/2018 | Lee | |
| 2019/0029065 A1 | 1/2019 | Park | |
| 2019/0261185 A1* | 8/2019 | Velev | H04W 48/18 |
| 2019/0394715 A1 | 12/2019 | Prasad | |

FOREIGN PATENT DOCUMENTS

| | | |
|---|---|---|
| CN | 106713406 | 5/2017 |
| KR | 10-2017-0119296 | 10/2017 |
| RU | 2 517 684 | 5/2014 |

OTHER PUBLICATIONS

International Search Report and Written Opinion dated Sep. 10, 2019 issued in International application No. PCT/EP2019/059362. (28 pages).

ZTE, "Proposed Network Slicing Update to 23.501 Clause 5.13", SA WG2 Meeting #118bis, S2-170324, Spokane, WA (Jan. 2017). (4 pages).

(Continued)

*Primary Examiner* — Huy C Ho
(74) *Attorney, Agent, or Firm* — Rothwell, Figg, Ernst & Manbeck, P.C.

(57) ABSTRACT

Network slice configuration update methods for providing a user equipment (UE) registered with (or attempting to register with) a Public Land Mobile Network (PLMN) the most up-to-date Configured NSSAI for the PLMN.

16 Claims, 13 Drawing Sheets

(56) References Cited

OTHER PUBLICATIONS

3GPP TS 23.501 V15.0.0 (Dec. 2017); 3rd Generation Partnership Project; Technical Specification Group Services and System Aspects; System Architecture for the 5G System; Stage 2 (Release 15). (Dec. 2017). (181 pages).
3GPP TS 23.502 V15.0.0 (Dec. 2017); 3rd Generation Partnership Project; Technical Specification Group Services and System Aspects; Procedures for the 5G System; Stage 2 (Release 15) (Dec. 2017). (258 pages).
3GPP TS 23.501 V15.1.0 (Mar. 2018); 3rd Generation Partnership Project; Technical Specification Group Services and System Aspects; System Architecture for the 5G System; Stage 2; (Release 15), (Mar. 2018). (201 pages).
3GPP TS 23.502 V15.1.0 (Mar. 2018); 3rd Generation Partnership Project; Technical Specification Group Services and System Aspects; Procedures for the 5G System; Stage 2; (Release 15), (Mar. 2018). (285 pages).
Huawei, Discussion for UE Configured NSSAI update, S2-183344, SA WG2 Meeting #127, Apr. 2018 (3 pages).
Huawei, Configured NSSAI update, S2-183371, 3GPP TSG-SA2 Meeting #127, Apr. 2018 (7 pages).

\* cited by examiner

NETWORK SLICE CONFIGURATION UPDATE

CROSS-REFERENCE TO RELATED APPLICATIONS

This application is a continuation of U.S. application Ser. No. 16/346,445, filed on Apr. 30, 2019 (status pending), which is a 35 U.S.C. § 371 National Stage of International Patent Application No. PCT/EP2019/059362, filed Apr. 12, 2019, which claims priority to U.S. provisional application No. 62/657,754, filed on Apr. 14, 2018. The above identified applications are incorporated by this reference

TECHNICAL FIELD

Disclosed are embodiments related to managing network slice configuration updates.

BACKGROUND

The Third Generation Partnership Project (3GPP) has begun on work on the development and design of the next generation mobile communications system (a.k.a., the 5G mobile communication system or the Next Generation (NG) system or simply "5G" or "NG" for short). 3GPP is currently in the process of specifying the 5G radio interface called New Radio (NR) as well as a Next Generation Packet Core Network (NG-CN or NGC).

Network slicing (i.e., employing network slices in a network) is one of the key features of 5G. A network slice is a logical network that provides specific network capabilities and network characteristics. Network slicing increases network resource utilization efficiency and deployment flexibility and supports fast growing over the top (OTT) applications and services. 3GPP Technical Specification (TS) 23.501 v15.1.0 (TS 23.501) defines Stage-2 System Architecture for the 5G System which includes network slicing, and 3GPP TS 23.502 v15.1.0 defines procedures for the 5G System.

As explained in TS 23.501, clause 5.15.1:

Network slices may differ for supported features and network functions optimisations, in which case such Network Slices may have e.g. different S-NSSAIs with different Slice/Service Types (see clause 5.15.2.1). The operator can deploy multiple Network Slice instances delivering exactly the same features but for different groups of UEs, e.g. as they deliver a different committed service and/or because they are dedicated to a customer, in which case such Network Slices may have e.g. different S-NSSAIs with the same Slice/Service Type but different Slice Differentiators (see clause 5.15.2.1).

The network may serve a single UE with one or more Network Slice instances simultaneously via a 5G-AN and associated with at most eight different S-NSSAIs in total, regardless of the access type(s) over which the UE is registered (i.e. 3GPP Access and/or N3GPP Access). The AMF instance serving the UE logically belongs to each of the Network Slice instances serving the UE, i.e. this AMF instance is common to the Network Slice instances serving a UE.

A S-NSSAI (Single Network Slice Selection Assistance Information) identifies a network slice, and a NSSAI is a set of S-NSSAIs.

Regarding the storage of NSSAI (collection of S-NSSAIs) in the UE, clause 5.15.4 of TS 23.501 states the following:

A UE can be configured by the HPLMN with Network Slice configuration information.

The Network Slice configuration information contains one or more Configured NSSAI(s). A Configured NSSAI may apply either to one PLMN or to all PLMNs that do not have a specific Configured NSSAI (e.g. this could be possible for NSSAIs containing only S-NSSAIs with standard values, see clause 5.15.2.1). There is at most one Configured NSSAI per PLMN.

The Configured NSSAI of a PLMN may include S-NSSAIs that have standard values or PLMN-specific values.

The Configured NSSAI for the Serving PLMN includes the S-NSSAI values which can be used in the Serving PLMN and may be associated with mapping of each S-NSSAI of the Configured NSSAI to one or more corresponding S-NSSAI values in the Configured NSSAI for the HPLMN.

The S-NSSAIs in the Configured NSSAI for the HPLMN, at the time when they are provided to the UE, shall match the Subscribed S-NSSAIs for the UE. When the Subscribed S-NSSAI(s) are updated (i.e. removing an old and/or adding a new) and it is applicable to the Serving PLMN the UE is registered in as described in clause 5.15.3, the AMF may update the UE with the Configured NSSAI of the Serving PLMN and/or Allowed NSSAI and/or the associated mapping with Configured NSSAI for the HPLMN.

When providing a Requested NSSAI to the network upon registration, the UE in a given PLMN only includes and uses S-NSSAIs applying to this PLMN, possibly associated with mapping of each S-NSSAI of the Requested NSSAI to the S-NSSAIs of the Configured NSSAI for the HPLMN i.e. part of the Configured and/or Allowed NSSAIs applicable for this PLMN. Upon successful completion of a UE's Registration procedure over an Access Type, the UE obtains an Allowed NSSAI for this Access Type, which includes one or more S-NSSAIs, from the AMF, possibly associated with mapping of Allowed NSSAI to Configured NSSAI for the HPLMN. These S-NSSAIs are valid for the current Registration Area and Access Type provided by the AMF the UE has registered with and can be used simultaneously by the UE (up to the maximum number of simultaneous Network Slices or PDU Sessions).

With respect to the updating of UE network slice configuration information, TS 23.501 in section 5.15.4.2 states:

At any time, the AMF may provide the UE with a new Configured NSSAI for the Serving PLMN, associated with mapping of the Configured NSSAI to the Configured NSSAI for the HPLMN as specified in clause 5.15.4.1. The Configured NSSAI for the Serving PLMN and the mapping information is either determined in the AMF (if based on configuration, the AMF is allowed to determine the Network Slice configuration for the whole PLMN) or by the NSSF. The AMF provides the new Configured NSSAI as specified in TS 23.502 [3], clause 4.2.4 UE Configuration Update procedure.

If the HPLMN performs the configuration update of a UE registered in the HPLMN (e.g. due to a change in the Subscribed S-NSSAI(s)), this results in updates to the Configured NSSAI for the HPLMN. Updates to the Allowed NSSAI and/or, if present, to the associated mapping of the Allowed NSSAI to the Configured NSSAI for the HPLMN are also possible if the configuration update affects S-NSSAI(s) in the current Allowed NSSAI.

If the VPLMN performs the configuration update of a UE registered in the VPLMN (e.g. due to a change in the Subscribed S-NSSAI(s)), this results in updates to the Configured NSSAI for the Serving PLMN and/or to the associated mapping of the Configured NSSAI for the Serving PLMN to the Configured NSSAI for the HPLMN. Updates to the Allowed NSSAI and/or to the associated mapping of the Allowed NSSAI to the Configured NSSAI for the HPLMN are also possible if the configuration update affects S-NSSAI(s) in the current Allowed NSSAI.

SUMMARY

In some scenarios the Configured NSSAI for a Public Land Mobile Network (PLMN) in a UE cannot be updated successfully. That is, in some scenarios the network cannot provide to the UE the most up-to-date Configured NSSAI for a PLMN. Consider an example scenario in which the Subscribed S-NSSAIs for the UE is updated by adding a new S-NSSAI to the UE's Subscribed S-NSSAIs. If this update occurs while the UE is registered in a particular visited PLMN (VPLMN-1), then the AMF in VPLMN-1 can be notified of the modification by the UE's UDM, and then, as a result of the notification, the AMF in VPLMN-1 can perform a configuration update for the UE to update the Configured NSSAI for VPLMN-1 in the UE and associated mapping of the Configured NSSAI for VPLMN-1 to the Configured NSSAI for the HPLMN. When the UE leaves VPLMN-1 and registers with a new VPLMN (VPLMN-2), the AMF in VPLMN-2 may obtain the up-to-date Configured NSSAI for the Serving PLMN (i.e., VPLMN-2), but the AMF has no way to know that the UE does not have this up-to-date Configured NSSAI for the Serving PLMN. Hence, the Configured NSSAI for VPLMN-2 in the UE will not get updated because the AMF in VPLMN-2 is not aware that the Subscribed S-NSSAI for the UE was modified compared to the Configured NSSAI for VPLMN-2 in the UE.

Therefore, there is a desire to modify the system such that the Configured NSSAIs for the Serving PLMNs can be updated as needed (i.e., a UE registered with (or attempting to register with) a PLMN can be provided with the most up-to-date Configured NSSAI for the PLMN at the earliest opportunity).

Accordingly, this disclosure provides an improved network slice configuration update method. In one embodiment the method is performed by a UE and includes:

Step 1: the UE obtaining information indicating that a set of network slice identifiers included in the UE's subscription information ("Subscribed Network Slices") has been updated (i.e., at least one network slice identifier (e.g., S-NSSAI) has been added to or removed from the set of network slice identifiers). Step 2: after obtaining the information indicating that the Subscribed Network Slices has been updated, the UE setting a particular flag for a first VPLMN to a certain value. Step 3: during a registration process for registering with the first VPLMN, the UE determines whether the particular flag is set to the certain value. Step 4: as a result of determining that the particular flag is set to the certain value, the UE sending to a network function within the VPLMN (e.g., an AMF within the VPLMN) a notification indicating that the network function should provide to the UE a set of network slice identifiers for the VPLMN (and associated mapping to subscribed S-NSSAIs if any).

An advantage of the above process is that the UE triggers the first VPLMN to perform a Configured NSSAI update procedure by the UE sending the notification, and, thereby, the UE's Configured NSSAIs will be up-to-date. An additional advantage includes not having to maintain indications in the UDM about the status of the UE's Configured NSSAI per PLMN, thereby saving storage space in the UDM. Further, compared to other proposed solutions (e.g., Option 1 disclosed in "Discussion for UE Configured NSSAI update" (source Huawei, Hisilicon) (S2-183344) (SA WG2 Meeting #127)), less data is transmitted over the air to the UE, thereby increasing network efficiency and UE battery life.

Additional embodiments further disclosed herein.

BRIEF DESCRIPTION OF THE DRAWINGS

The accompanying drawings, which are incorporated herein and form part of the specification, illustrate various embodiments.

DETAILED DESCRIPTION

Figure 1A:
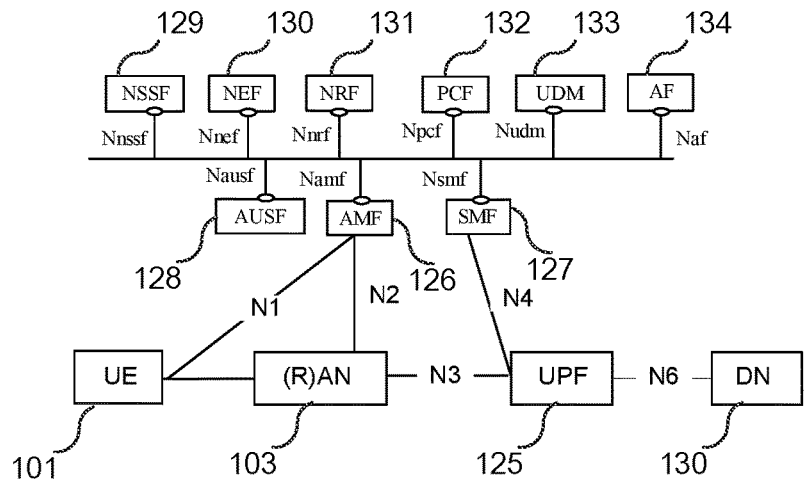
FIG. 1A depicts a non-roaming reference architecture.

FIG. 1A depicts a non-roaming reference architecture of a communications system 100 according to one embodiment. In the example shown, system 100 is a 5G system. More specifically, FIG. 1A depicts a UE 101 that is connected to an access network (AN) 103, which may be a radio access network (RAN). AN 103 is connected to an Access and Mobility Management Function (AMF) 126 via a N2 reference point and the AN is also connected to a User plane Function (UPF) 125 via an N3 reference point. UPF 125 is adapted to be connected to a Session Management Function (SMF) 127 via a N4 reference point and is adapted to be connected to a data network (DN) 120 via a N6 reference point. The DN may be e.g. operator services, Internet access or 3rd party services. UE 101 is also connected to AMF 126 via a N1 reference point. As further shown in FIG. 1A, system 100 further includes the following additional network functions: an Authentication Server Function (AUSF) 128, a Network Slice Selection Function (NSSF) 129, a Network Exposure Function (NEF) 130, a (NRF) 131, a Policy Control function (PCF) 132, a Unified Data Management (UDM) 133, and an Application Function (AF) 134. Each of the network functions 126-134 exhibits a service based interface. For example, the service based interface exhibited by the NSSF 129 is referred to as "Nnssf". Similarly, the service based interface exhibited by AMF 126 is referred to as "Namf".

Figure 1B:
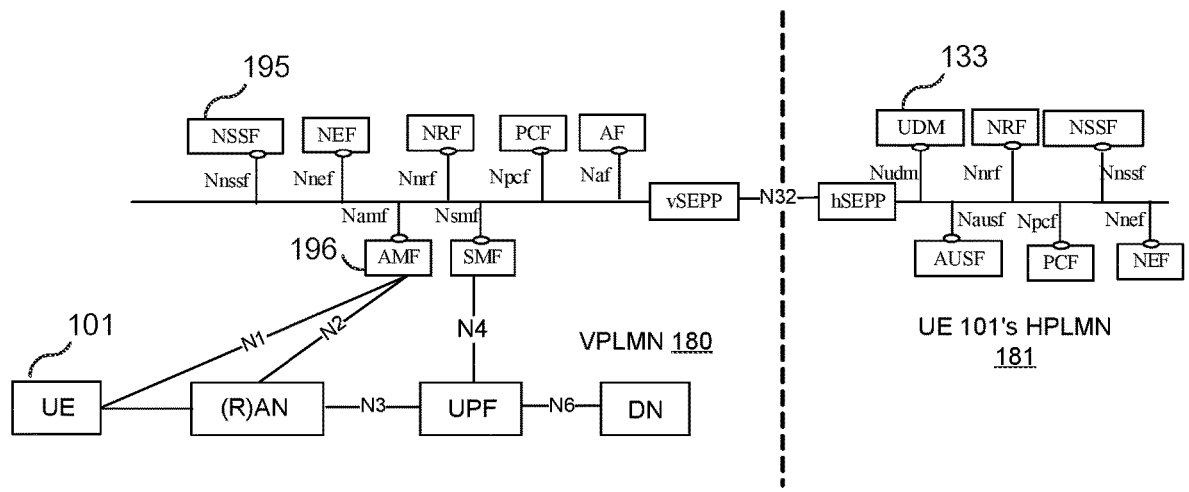
FIG. 1B depicts the 5G system roaming architecture.

FIG. 1B depicts a roaming reference architecture. More specifically, FIG. 1B shows UE 101 being served by a visited PLMN (VPLMN) 180, which can communicate with the UDM 133 for the UE (i.e., the UDM in the UE's home PLMN (HPLMN) 181). As shown in FIG. 1B, VPLMN, includes an AMF 196 and an NSSF 195.

UE 101 may be any communication device, mobile or stationary, enabled to communicate over a wireless channel (e.g., radio channel) with a node of an AN (e.g., a base station). For instance, UE 101 may be a mobile phone, smart phone, sensor, meter, vehicle, appliance (household, medical, etc.), media player, camera, Machine to Machine (M2M) device or any type of consumer electronic, for instance but not limited to television, radio, lighting arrangements, tablet computer, laptop or Personal Computer (PC). UE 101 may be portable, pocket storable, hand held, computer comprised, or vehicle mounted, and may be enabled to communicate voice and/or data, via the radio access network, with another entity, such as another UE or a server.

The AN 103 may comprise a AN node (not shown in FIG. 1) such as a NodeB, an eNodeB, a gNB (or other base station) or any other network unit capable to communicate over a radio carrier with the UE 101. The abbreviations AN and RAN may be used interchangeably herein when referring to an access network, a radio access network, a node (e.g., gNB or other base station) comprised in the access network. The AN may include both 3GPP radio access network and non-3GPP access network. A typical non-3GPP access network is a Wi-Fi network. The embodiments in this disclosure apply to both 3GPP radio access network and non-3GPP access network.

As described above, it is important that the Configured NSSAIs for the Serving PLMN in a UE are updated at the appropriate time. Disclosed here are some embodiments for achieving this goal.

In some embodiments, when a change is made to a UE's Subscribed S-NSSAIs (adding or removing an S-NSSAI from the subscription), the UDM via AMF indicates to the UE that the set of subscribed S-NSSAIs is changed (this means that the Configured NSSAI for any PLMN is to be regarded as unreliable until a new Configured NSSAI for the PLMN is received by the UE) regardless of the PLMN (home or visited PLMN) in which the UE is currently registered or with which the UE is attempting to register. Configured NSSAI for the serving PLMN may (as normal) be provided to the UE.

In some embodiments, the UE shall when receiving the indication that Configured NSSAI for any PLMN (except serving PLMN if the UE received a new Configured NSSAI for that PLMN) is unreliable set a flag for these stored Configured NSSAIs, which flag indicates that the Configured NSSAIs are unreliable. Then, when the UE makes a registration attempt in a PLMN for which the stored Configured NSSAI is indicated as unreliable, the UE shall provide a certain indication to the AMF. The AMF receiving such indication shall provide the UE with a new Configured NSSAI. The UE, after receiving the new Configured NSSAI for the PLMN, shall set the flag indicating that the stored Configured NSSAI for that PLMN is now reliable (i.e., up-to-date).

Furthermore, in some embodiments, if the UE receives a new Configured NSSAI for the HPLMN (thus obtaining the new set of subscribed S-NSSAIs) then the UE shall adjust the stored Allowed NSSAI and stored Configured NSSAI for any VPLMN based on the received new set of subscribed S-NSSAI. For example, if a previously included S-NSSAI is deleted from the UE's subscribed S-NSSAIs, then the UE shall remove from an Allowed NSSAI for a VPLMN the S-NSSAI that corresponds to the removed S-NSSAI and, likewise, shall remove from the stored Configured NSSAI for the VPLMN the S-NSSAI that corresponds to the removed S-NSSAI.

In another embodiment, instead of UDM (via AMF) providing to the UE a parameter explicitly indicating to the UE that the set of subscribed S-NSSAI is changed (e.g. leading to UE flag setting as described above), the UE uses the fact that the UE been provisioned with a new Configured NSSAI for the HPLMN as an indication to initiate the flag setting as described above.

Figure 2:
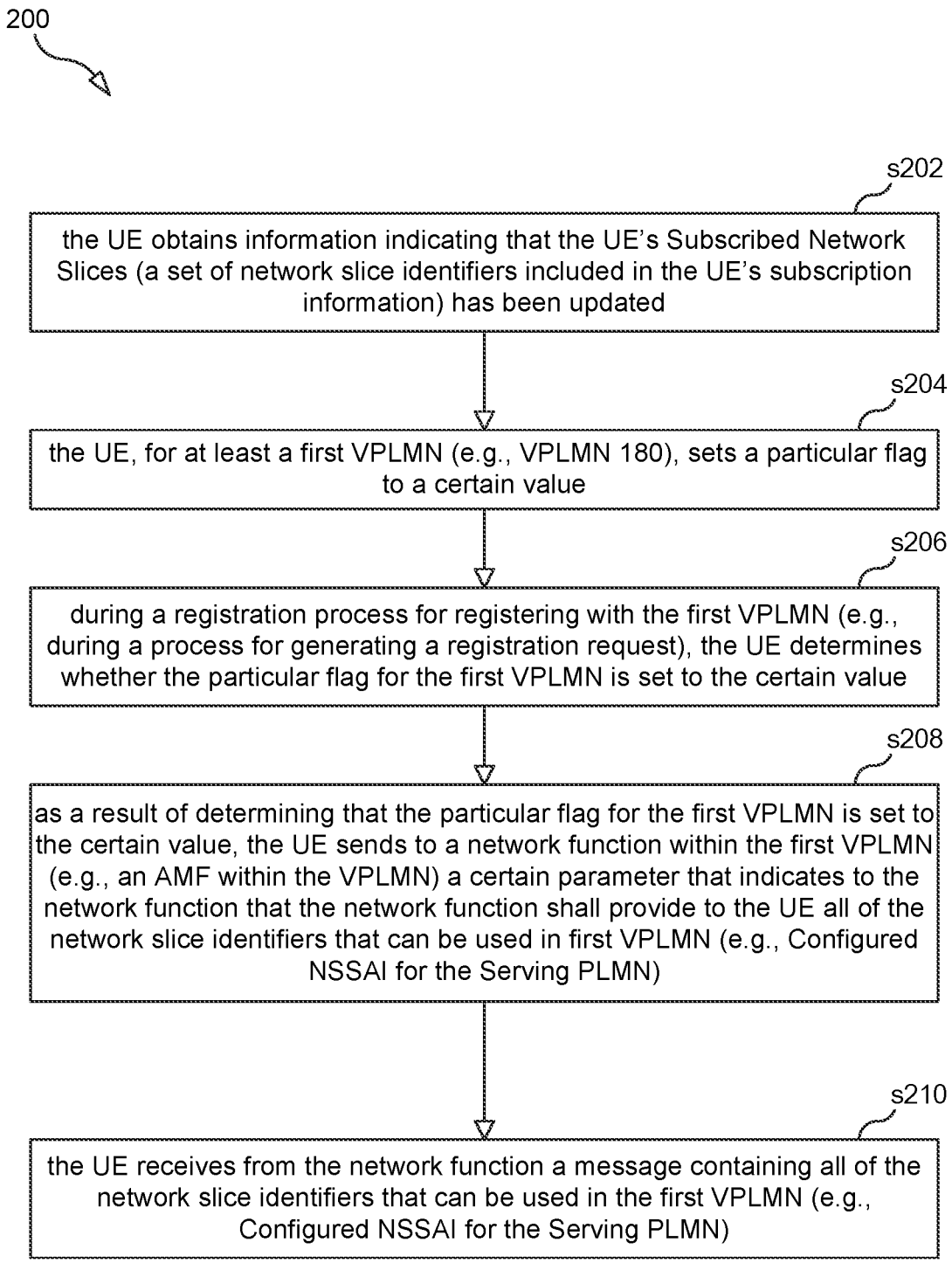
FIG. 2 is a flow chart illustrating a process according to some embodiments.

Referring now to FIG. 2, FIG. 2 is a flowchart illustrating a process 200, according to some embodiments, that is performed by a UE (e.g., UE 101). Process 200 may begin with step s202.

In step s202, the UE obtains information indicating that a set of network slice identifiers (e.g., a set of S-NSSAIs) included in the UE's subscription information has been updated (i.e., at least one network slice identifier (e.g., S-NSSAI) has been added to or removed from the set of network slice identifiers). This set of network slice identifiers may be referred to herein as the "UE's Subscribed Network Slices" or, for short, the "Subscribed Network Slices." Other terms for this set of network slice identifiers is "Configured NSSAI for the HPLMN" and "Subscribed S-NSSAIs for the UE."

For example, if the AMF serving UE 101 is AMF 196 (i.e., UE 101 is registered in VPLMN 180, and thus VPLMN 180 is the "Serving PLMN"), then AMF 196 may send to the UE a message (e.g., UE Configuration Update command or Registration Accept message) containing a certain parameter explicitly indicating that the Subscribed Network Slices has been updated. In this way, the UE can obtain the information indicating that the Subscribed Network Slices have been updated. Additionally, the message may also contain Configured NSSAI for VPLMN 180 (i.e., Configured NSSAI for the Serving PLMN) and information mapping of each S-NSSAI of the Configured NSSAI for the Serving PLMN to an S-NSSAI of the Configured NSSAI for the HPLMN. This mapping information is referred to as "Mapping of Configured NSSAI." In some embodiments, the message may also contain the most up-to-date Subscribed Network Slices (i.e., Configured NSSAI for the HPLMN) for the UE. In such an embodiments in which the message includes the UE's Subscribed Network Slices, it is not necessary for the message to also contain the separate certain parameter that explicitly indicates that the Subscribed Network Slices has been updated because the presence of the Subscribed Network Slices in the message serves to inform the UE that the Subscribed Network Slices has been updated. Thus, in some embodiments, the UE obtains the indicating that the Subscribed Network Slices have been updated by receiving a message containing the Configured NSSAI for the HPLMN.

As another example, if the UE is registered in VPLMN 180, then the UE may obtain the information by receiving a message containing the up-to-date Subscribed Network Slices, which message is transmitted by a network function in the UE's HPLMN (e.g., UDM 133) to the UE via VPLMN 180 in a manner transparent to the VPLMN 180.

As another example, if the AMF serving UE 101 is AMF 126 (i.e., UE 101 is registered in HPLMN 181 (i.e., the home PLMN for the UE)), then AMF 126 may send to the UE a message (e.g., UE Configuration Update command or Registration Accept message) containing the most up-to-date version of the Subscribed Network Slices (i.e., Configured NSSAI for the HPLMN). Such a message indicates to the UE that the Subscribed Network Slices has been updated.

In step s204, after obtaining the information indicating that the Subscribed Network Slices has been updated, the UE, for at least a first VPLMN (e.g., VPLMN 180), sets a particular flag to a certain value (a logical value of TRUE). For example, in step s204, for each VPLMN for which the UE has Configured NSSAI, the UE sets a particular flag to TRUE for the VPLMN. For instance, if the UE has in it local storage Configured NSSAI for VPLMN-X and Configured NSSAI for VPLMN-Y, then the UE will set a first flag to TRUE for VPLMN-X and set a second flag to TRUE for VPLMN-Y. As used herein, "setting a particular flag to a certain value" for a VPLMN means that the UE stores a parameter set to a particular value (e.g., a bit set to a logical value of TRUE) associated with the VPLMN.

In step s206, during a registration process for registering with the first VPLMN (e.g., during a process for generating a registration request), the UE determines whether the particular flag for the first VPLMN is set to the certain value (e.g., whether the flag is TRUE or not).

In step s208, as a result of determining that the particular flag for the first VPLMN is set to the certain value, the UE sends to a network function within the first VPLMN (e.g., an AMF within the VPLMN) a certain parameter that indicates to the network function that the network function shall provide to the UE all of the network slice identifiers that can be used in first VPLMN (e.g., Configured NSSAI for the Serving PLMN). For example, in one embodiment the certain parameter indicates that the Configured NSSAI for the first VPLMN in the UE is unreliable. This certain parameter may be included in, for example, a registration request message that the UE sends in order to register with the first VPLMN.

In step s210, after transmitting the certain parameter to the network function, the UE receives from the network function a message containing all of the network slice identifiers that can be used in the first VPLMN (e.g., Configured NSSAI for the Serving PLMN). For example, the message may be a registration accept message. In addition to containing the Configured NSSAI for the Serving PLMN, the registration accept message may also contain Mapping Of Configured NSSAI, Allowed NSSAI (which includes a set of one or more S-NSSAIs—e.g., S-NSSAIs that can be used in the Serving PLMN), and mapping of Allowed NSSAI to Configured NSSAI for the HPLMN ("Mapping Of Allowed NSSAI"). In some embodiments, the sole reason that the network function includes in the message the Configured NSSAI for the Serving PLMN and Mapping of Configured NSSAI is because the UE sent the certain parameter.

In some embodiments, process 200 further includes the UE determining whether the UE is currently provisioned with a set of network slice identifiers for the first VPLMN. This step is performed by the UE between steps s202 and s204—i.e., after the UE obtains the information indicating that the Subscribed Network Slices has been updated and prior to the UE setting the particular flag for the first VPLMN to the certain value. The UE sets the particular flag to the certain value as a result of i) obtaining the information indicating that the Subscribed Network Slices has been updated and ii) determining that the UE is currently provisioned with a set of network slice identifiers for the first VPLMN.

Figure 3:
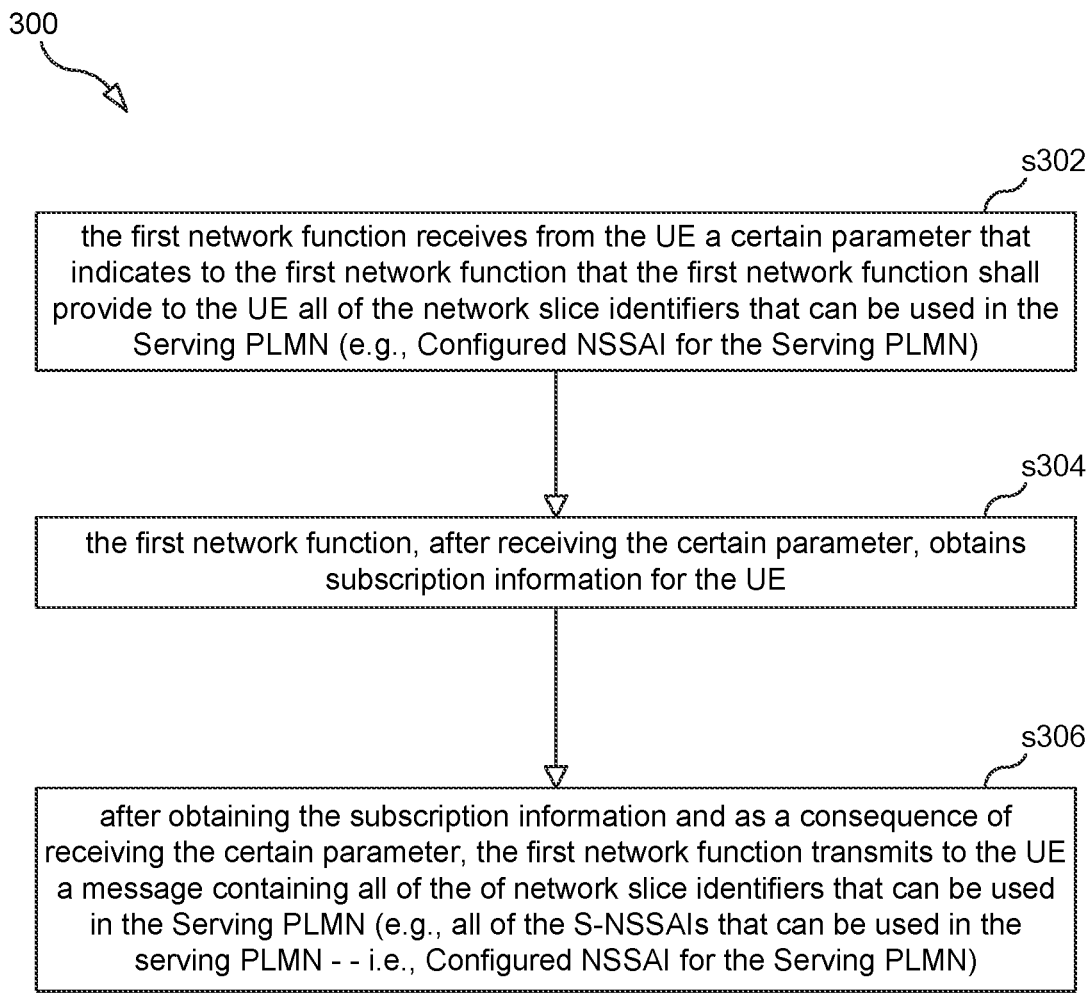
FIG. 3 is a flow chart illustrating a process according to some embodiments.

FIG. 3 is a flowchart illustrating a process 300, according to some embodiments, that is performed by a first network function (e.g., AMF 196) in a PLMN (e.g. VPLMN 180) when a UE is attempting to register with the PLMN, which PLMN is referred to as the "Serving PLMN," wherein the Serving PLMN is not the UE's HPLMN (i.e., the Serving PLMN is a VPLMN with respect to the UE). Process 300 may begin with step s302.

In step s302, the first network function receives from the UE a certain parameter that indicates to the first network function that the first network function shall provide to the UE all of the network slice identifiers that can be used in the Serving PLMN (e.g., Configured NSSAI for the Serving PLMN). This certain parameter may be included in, for example, a registration request message that the UE sends to the first network function in order to register with the Serving PLMN.

In step s304, the first network function, after receiving the certain parameter, obtains subscription information for the UE. For example, in step s304, the first network function transmits to UDM 133 a get request (e.g. Nudm_SDM_Get) and receives from the UDM 133 in response to the get request a response that comprises subscription information for the UE, which may include a subset of the UE's Subscribed Network Slices, which identifies the network slices that the UE can use in the Serving PLMN.

In step s306, after obtaining the subscription information and as a consequence of receiving the certain parameter, the first network function transmits to the UE a message containing all of the network slice identifiers that can be used in the Serving PLMN (e.g., all of the S-NSSAIs that can be used in the serving PLMN—i.e., Configured NSSAI for the Serving PLMN). The first network function may obtain this information from an NSSF. The message sent in step s306 can be, for example, a 5G Registration Accept message, and the 5G Registration Accept message may further contain: Allowed NSSAI, Mapping of Allowed NSSAI, Mapping of Configured NSSAI. That is, in some embodiments, as a direct result of receiving the certain parameter, the first network function determines that it shall include in the Registration Accept message the Configured NSSAI for the Serving PLMN.

Figure 4:
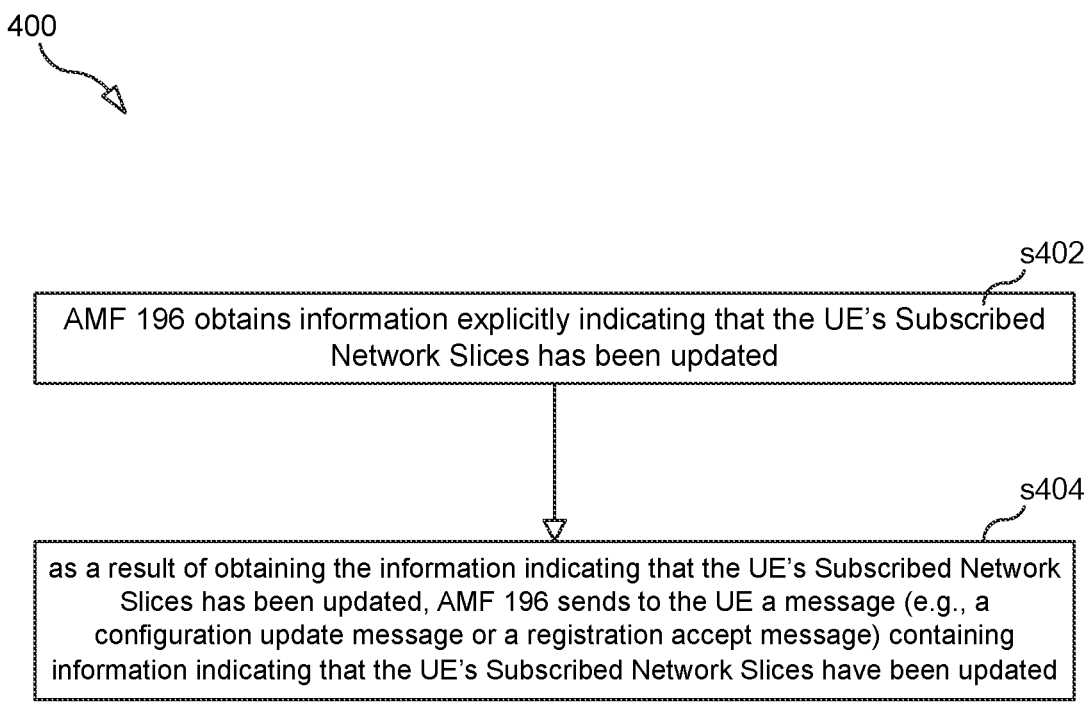
FIG. 4 is a flow chart illustrating a process according to some embodiments.

FIG. 4 is a flowchart illustrating a process 400, according to some embodiments, that is performed by a first network function (e.g., AMF 196) in a PLMN (e.g., VPLMN 180), which PLMN is referred to as the "Serving PLMN." In this example, the Serving PLMN is VPLM 180—i.e., the Serving PLMN is not the HPLMN for the UE (HPLMN 181). Process 400 may begin with step s402.

In step s402, AMF 196 obtains information explicitly indicating that the UE's Subscribed Network Slices has been updated. For example, in step s402, AMF 196 receives from UDM 133 a message containing a parameter explicitly indicating that the UE's Subscribed Network Slices has been updated and/or containing the UE's updated Subscribed Network Slices (Configured NSSAI for the HPLMN). As one example, the message may be a Nudm_SDM_Notification transmitted by UDM 133. As another example, the message may be response message transmitted by UDM 133 in response to a Nudm_SDM get that was transmitted by AMF 196 to UDM 133 as part of a registration process for registering the UE (e.g., an Nudm_SDM_get that was transmitted by AMF 196 after the AMF 196 received a Registration Request for registering the UE and before AMF 196 transmits in response to the Registration Request a Registration Accept).

In step s404, as a result of obtaining the information indicating that the UE's Subscribed Network Slices has been updated, AMF 196 sends to the UE a message (e.g., a configuration update message or a registration accept message) containing information indicating that the UE's Subscribed Network Slices have been updated. As one example, the message may comprise a parameter explicitly indicating that the Subscribed Network Slices has been updated. As another example, instead of including the parameter, the message includes the Configured NSSAI for the HPLMN, which serves to provide the to the UE the indication that the Subscribed Network Slices has been updated. In some embodiments, in addition to including the parameter and/or Configured NSSAI for the HPLMN, the message may also contain: Configured NSSAI for the Serving PLMN, Mapping of Configured NSSAI, Allowed NSSAI, and/or Mapping of Allowed NSSAI.

Figure 5:
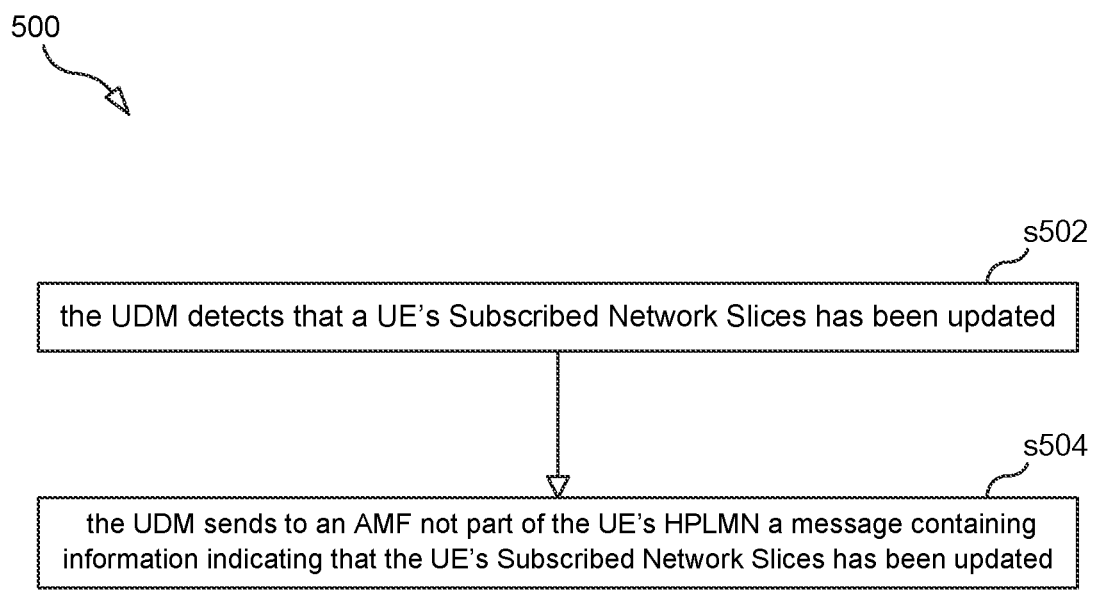
FIG. 5 is a flow chart illustrating a process according to some embodiments.

FIG. 5 is a flowchart illustrating a process 500, according to some embodiments, that is performed by UDM 133. Process 500 may begin with step s502.

In step s502, the UDM detects that a UE's Subscribed Network Slices has been updated.

In step s504, after detecting that the UE's Subscribed Network Slices has been updated, the UDM sends to AMF 196 (i.e., an AMF not part of the UE's HPLMN) a message containing information indicating that the UE's Subscribed Network Slices has been updated.

Figure 6:
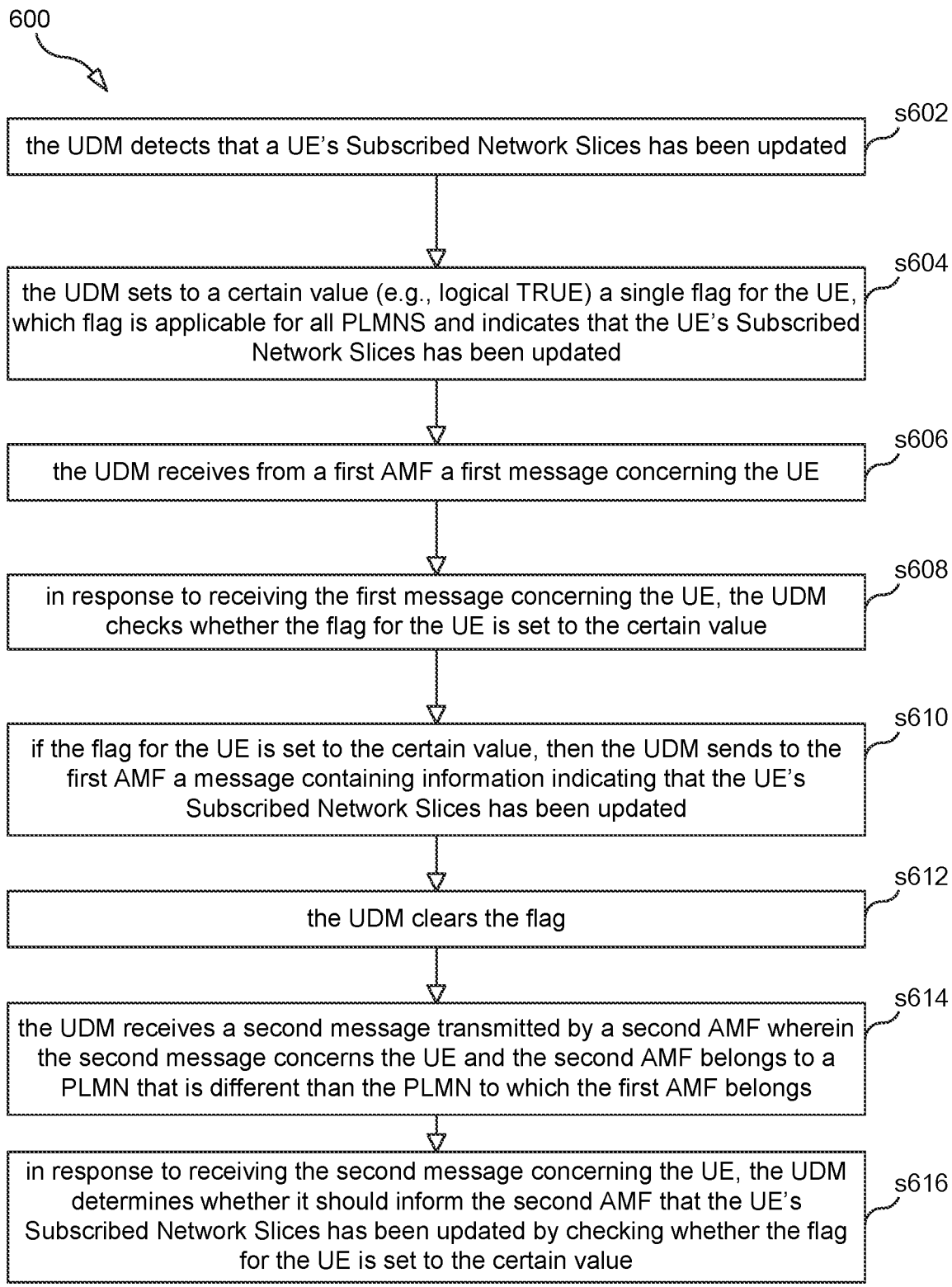
FIG. 6 is a flow chart illustrating a process according to some embodiments.

FIG. 6 is a flowchart illustrating a process 600, according to some embodiments, that is performed by UDM 133. Process 600 may begin with step s602.

In step s602, the UDM detects that a UE's Subscribed Network Slices has been updated.

In step s604, after detecting that the UE's Subscribed Network Slices has been updated, the UDM sets to a certain value (e.g., logical TRUE) a single flag for the UE, which flag is applicable for all PLMNs and indicates that the UE's Subscribed Network Slices has been updated.

In step s606, after setting the flag for the UE, the UDM receives a first message concerning the UE from a first AMF (e.g., AMF 196 or AMF 126 (i.e., an AMF that is part of the UE's HPLMN)). For example, the message received in step s606 is a Nudm_SDM_Get or Nudm_SDM_Subscribe.

In step s608, in response to receiving the first message concerning the UE, the UDM checks whether the flag for the UE is set to the certain value.

In step s610, if the flag for the UE is set to the certain value, then the UDM sends to the first AMF a message containing information indicating that the UE's Subscribed Network Slices has been updated.

In step s612, after sending the message to the first AFM, the UDM clears the flag (i.e., set the flag to a new value such as logical FALSE). In some embodiments, the UDM clears the flag in response to receiving an acknowledge message indicating that the UE has been successfully informed that the UE's Subscribed Network Slices has been updated. It is advantageous for the UDM to clear the flag after receiving such an acknowledge message because it is possible the UE, for example, gets out of radio coverage at the time when AMF 196 needs to update the UE with a new Configured NSSAI and then later gets into radio coverage on another AMF which would not get the information about changed Subscribed NSSAI. Having the UDM wait until it gets the acknowledgement before clearing the flag would solve this problem.

In step s614, the UDM receives a second message transmitted by a second AMF, wherein the second message concerns the UE and the second AMF belongs to a PLMN that is different than the PLMN to which the first AMF belongs.

In step s616, in response to receiving the second message concerning the UE, the UDM determines whether it should inform the second AMF that the UE's Subscribed Network Slices has been updated by checking whether the flag for the UE is set to the certain value.

With respect to the message sent by the UDM 133 in step s504 and the message sent by the UDM 133 in step s610, each of these messages may be a message containing a parameter explicitly indicating that the UE's Subscribed Network Slices has been updated and/or containing the UE's updated Subscribed Network Slices (Configured NSSAI for the HPLMN). As one example, the message may be a Nudm_SDM_Notification transmitted by UDM 133. As another example, the message may be response message transmitted by UDM 133 in response to a Nudm_SDM get that was transmitted by the AMF 196 as part of a registration process for registering the UE.

Figure 7:
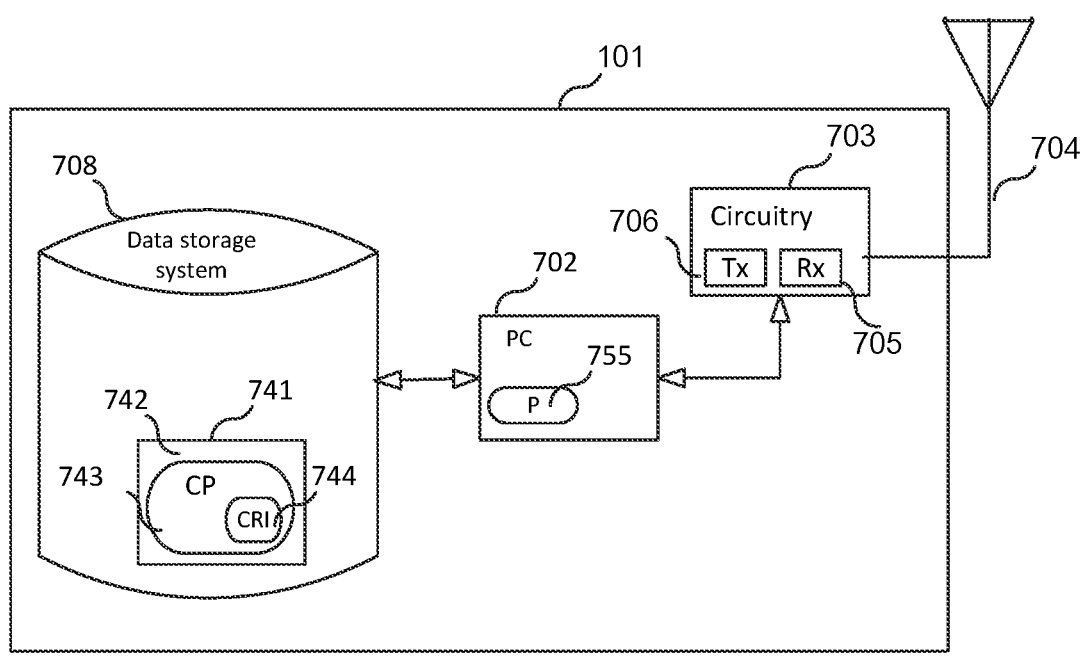
FIG. 7 is a block diagram of a UE according to some embodiments.

FIG. 7 is a block diagram of UE 101, according to some embodiments for performing the UE methods disclosed herein (see e.g., process 200 shown in FIG. 2). As shown in FIG. 7, may comprise: processing circuitry (PC) 702, which may include one or more processors (P) 755 (e.g., a general purpose microprocessor and/or one or more other processors, such as an application specific integrated circuit (ASIC), field-programmable gate arrays (FPGAs), and the like); circuitry 703 (e.g., radio transceiver circuitry comprising an Rx 705 and a Tx 706) coupled to an antenna system 704 for wireless communication with other UEs and/or access network nodes); and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes the UE to perform steps described herein (e.g., steps described herein with reference to the flow charts). In other embodiments, the UE may be configured to perform steps described herein without the need for code. That is, for example, PC 702 may consist merely of one or more ASICs. Hence, the features of the embodiments described herein may be implemented in hardware and/or software.

Figure 8:
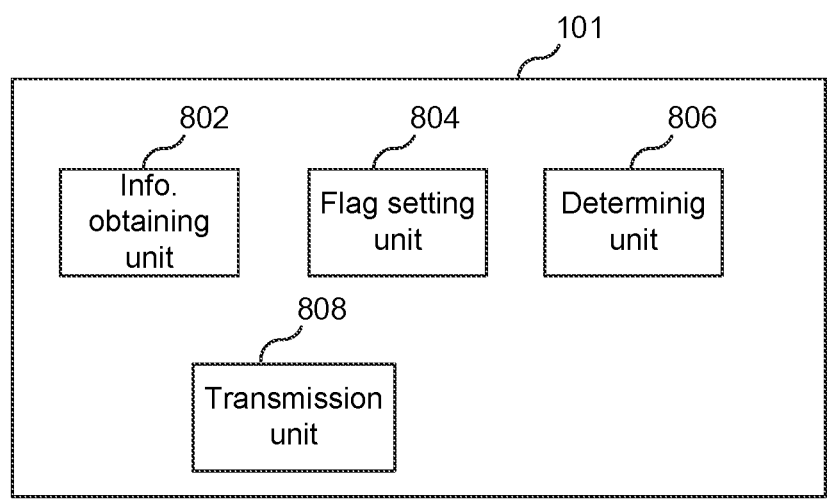
FIG. 8 is a diagram showing functional units of a UE according to some embodiments.

FIG. 8 is a diagram showing functional units of UE 101 according to some embodiments. In the embodiment shown, UE 101 includes:

1) an information obtaining unit 802 for obtaining information indicating that the UE's Subscribed Network Slices has been updated;
2) a flag setting unit 804 for setting a particular flag for a first VPLMN to a certain value after the information indicating that the Subscribed Network Slices has been updated is obtained;

3) a determining unit 806 configured such that, during a registration process for registering with the first VPLMN, UE determines whether the particular flag is set to the certain value; and
4) a transmission unit 808 that is configured such that, as a result of a determination that the particular flag is set to the certain value, the UE sends to a network function within the VPLMN (e.g., an AMF within the VPLMN) a notification indicating that the network function should provide to the UE a set of network slice identifiers for the VPLMN.

Figure 9:
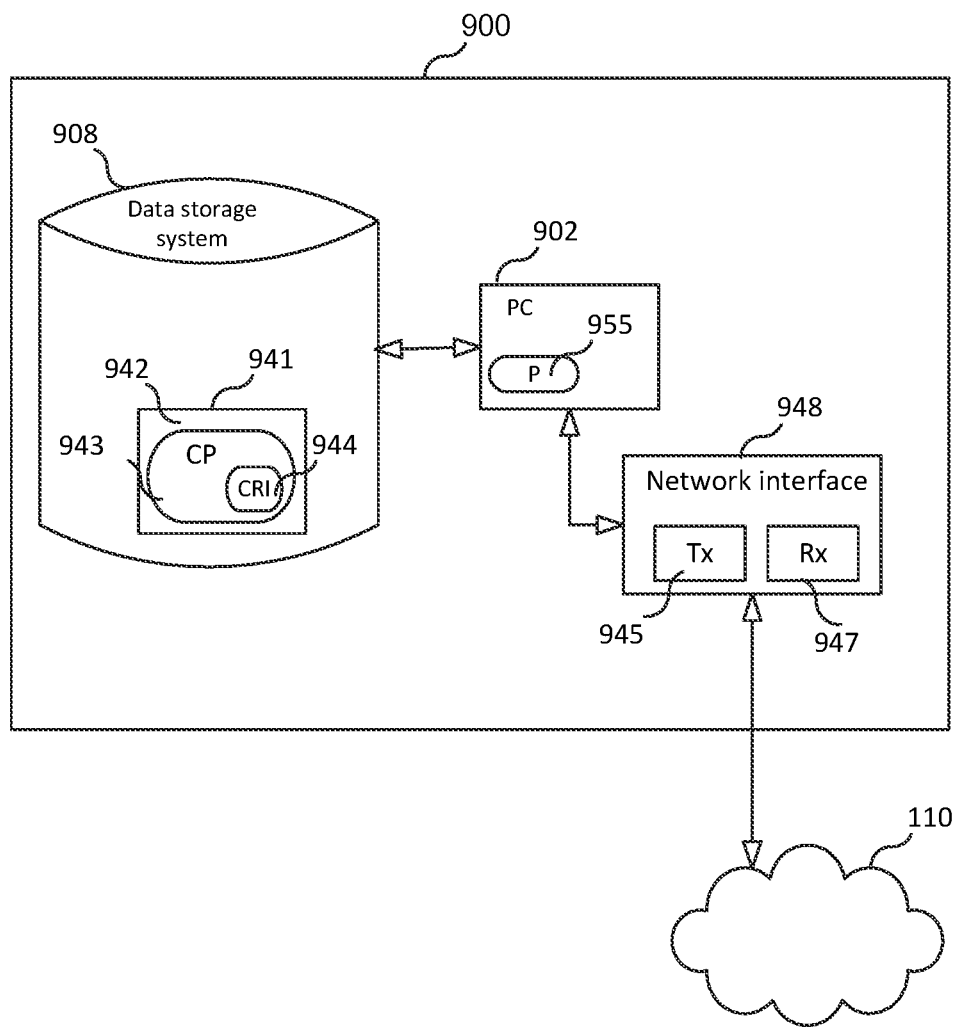
FIG. 9 is a block diagram of a network node according to some embodiments.

FIG. 9 is a block diagram of a network node 900 according to some embodiments for performing the network node methods disclosed herein (see e.g., processes 300, 400, 500, and 600 shown in FIGS. 3, 4, 5, and 6, respectively). As shown in FIG. 9, network node 900 may comprise: processing circuitry (PC) 902, which may include one or more processors (P) 955 (e.g., a general purpose microprocessor and/or one or more other processors, such as an application specific integrated circuit (ASIC), field-programmable gate arrays (FPGAs), and the like); a network interface 948 comprising a transmitter (Tx) 945 and a receiver (Rx) 947 for enabling network node 900 to transmit data to and receive data from other nodes connected to a network 110 (e.g., an Internet Protocol (IP) network) to which network interface 948 is connected; and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes network node 900 to perform steps described herein (e.g., steps described herein with reference to the flow charts). In other embodiments, network node 900 may be configured to perform steps described herein without the need for code. That is, for example, PC 902 may consist merely of one or more ASICs. Hence, the features of the embodiments described herein may be implemented in hardware and/or software.

Figure 10:
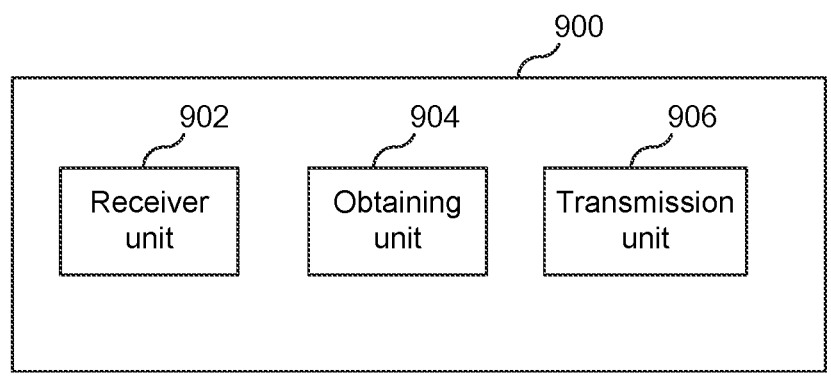
FIG. 10 is a diagram showing functional units of a network node according to some embodiments.

FIG. 10 is a diagram showing functional units of network node 900 according to some embodiments. In the embodiment shown, network node 900 includes:
1) a receiver unit 1002 for receiving a certain parameter transmitted by the UE, wherein the parameter indicates to the network node that the network node, which belongs to a PLMN, shall provide to the UE all of the network slice identifiers that can be used in the PLMN (e.g., the Configured NSSAI for the PLMN);
2) an obtaining unit 1004 for, obtaining subscription information for the UE after the receiver unit 1002 receives the certain parameter; and
3) a transmission unit 1006 for employing a transmitter to transmit to the UE a message containing all of the network slice identifiers that can be used in the PLMN, wherein the transmission unit is configured to employ the transmitter to transmit the message after the subscription information is obtained and as a consequence of the receiver unit receiving the certain parameter.

Figure 11:
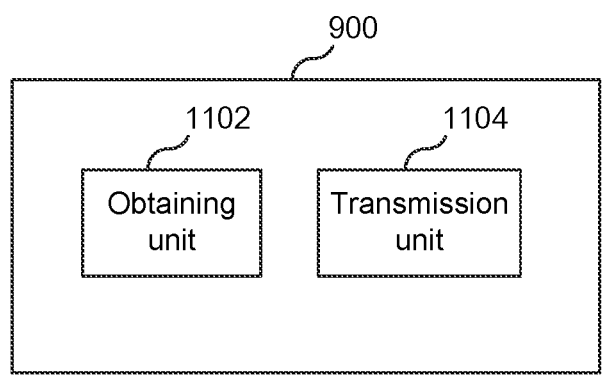
FIG. 11 is a diagram showing functional units of a network node according to some embodiments.

FIG. 11 is a diagram showing functional units of network node 900 according to some embodiments. In the embodiment shown, network node 900 includes:
1) an obtaining unit 1102 for obtaining information indicating that a UE's Subscribed Network Slices has been updated; and
2) a transmission unit 1104 for employing a transmitter to transmit to the UE a message (e.g., a configuration update message or a registration accept message) containing information indicating that the UE's Subscribed Network Slices have been updated, wherein the transmission unit is configured to employ the transmitter to transmit the message as a result of the network node obtaining the information indicating that the UE's Subscribed Network Slices has been updated.

Figure 12:
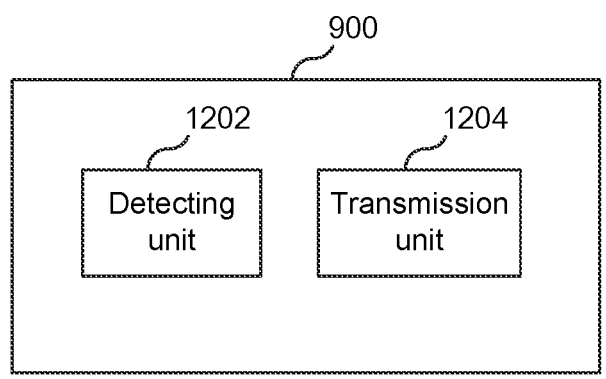
FIG. 12 is a diagram showing functional units of a network node according to some embodiments.

FIG. 12 is a diagram showing functional units of network node 900 according to some embodiments. In the embodiment shown, network node 900 includes:
1) a detecting unit 1202 for detecting that a UE's Subscribed Network Slices has been updated; and
2) a transmission unit 1204 for employing a transmitter to transmit to an AMF not part of the UE's HPLMN a message containing information indicating that the UE's Subscribed Network Slices has been updated, wherein the transmission unit 1104 is configured to employ the transmitter to transmit the message after the detecting unit 1202 detects that the UE's Subscribed Network Slices has been updated.

Figure 13:
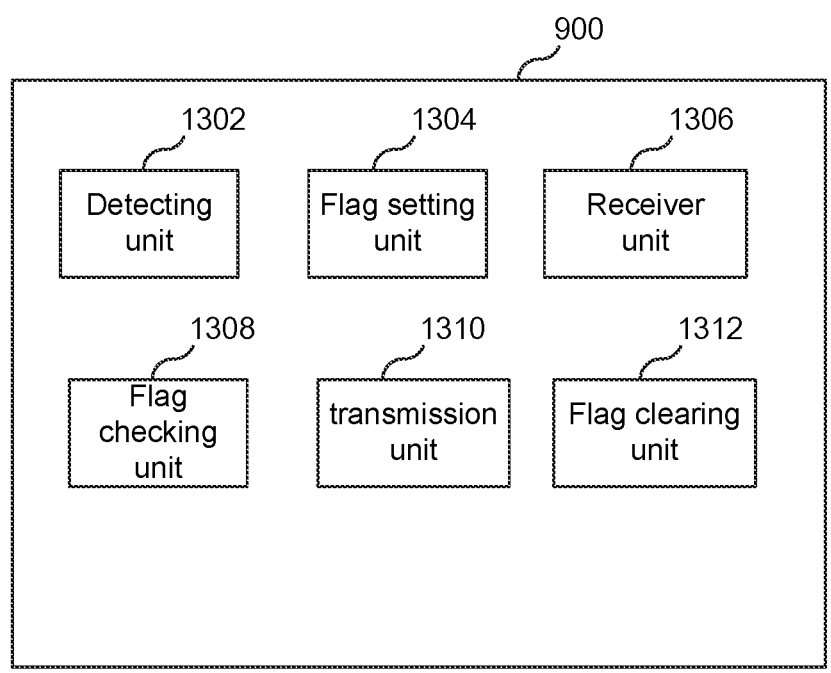
FIG. 13 is a diagram showing functional units of a network node according to some embodiments.

FIG. 13 is a diagram showing functional units of network node 900 according to some embodiments. In the embodiment shown, network node 900 includes:
1) a detecting unit 1302 for detecting that a UE's Subscribed Network Slices has been updated;
2) a flag setting unit 1304 for, after the detecting unit detects that the UE's Subscribed Network Slices has been updated, setting to a certain value a single flag for the UE, which flag is applicable for a plurality of PLMNs (e.g., all PLMNs in a roaming agreement) and indicates that the UE's Subscribed Network Slices has been updated;
3) a receiver unit 1306 operable to receive a first message after the flag setting unit sets the flag for the UE to the certain value, wherein the first message is transmitted by a first AMF and the first message concerns the UE (e.g., includes a UE identifier for identifying the UE);
4) a flag checking unit 1308 for checking the flag (i.e., determining whether the flag for the UE is set to the certain value), wherein the flag checking unit is configured to check the flag as a result of the receiver unit 1306 receiving the first message concerning the UE;
5) a transmission unit 1310 for employing a transmitter to transmit to the first AMF a message containing information indicating that the UE's Subscribed Network Slices has been updated, wherein the transmission unit is configured to employ the transmitter the message to the first AMF as a result of the flag checking unit 1308 determining that the flag for the UE is set to the certain value; and
6) a flag clearing unit 1312 for clearing the flag (i.e., set the flag to a new value such as logical FALSE) after the transmission unit 1310 employs the transmitter to transmit the message to the first AFM (e.g., in response to receiving an acknowledge message indicating that the UE has been successfully informed that the UE's Subscribed Network Slices has been updated).

The receiver unit 1306 is further operable to receive a second message (e.g., Nudm_SDM_Get or Nudm_SDM- _Subscribe) transmitted by a second AMF, wherein the second message concerns the UE and the second AMF belongs to a PLMN that is different than the PLMN to which the first AMF belongs. The network node is configured such that, in response to receiving the second message concerning the UE, the network node determines whether it should inform the second AMF that the UE's Subscribed Network Slices has been updated by checking whether the flag for the UE is set to the certain value.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A network slice configuration update method, the method being performed by a user equipment (UE) having subscription information, and the method comprising:
    the UE receiving a configuration update command transmitted by a management function within a current Public Land Mobile Network (PLMN), the configuration update command comprising a parameter indicating that a network slicing subscription change has occurred;
    after receiving the configuration update command, the UE initiating a registration procedure; and
    after receiving the configuration update command, the UE erasing a network slicing configuration for a non-current PLMN that is different than the current PLMN.

2. The method of claim 1, further comprising:
    the UE sending to a network function within the PLMN a notification indicating that the network function should provide to the UE a set of network slice identifiers for the PLMN.

3. The method of claim 2, further comprising, after receiving the configuration update command and prior to initiating the registration procedure, the UE setting a particular flag, wherein
    the UE sends to the network function within the PLMN the notification as a result of determining that the particular flag is set to the certain value.

4. The method of claim 1, wherein
    the configuration update command further comprises: Configured NSSAI for the PLMN, and/or Allowed NSSAI, and
    the management function is an Access and Mobility Management Function (AMF).

5. A non-transitory computer readable medium storing a computer program for configuring a UE to perform the method of claim 1.

6. A network slice configuration update method, the method being performed by a user equipment (UE) having subscription information, and the method comprising:
    the UE receiving a message transmitted by a management function within a current Public Land Mobile Network (PLMN), the message comprising: i) a network slicing indicator indicating that a network slicing subscription change has occurred and ii) network slicing information for the current PLMN;
    after receiving the message, the UE updating a configuration for the current PLMN based on the network slicing information; and
    in response to receiving the message comprising the network slicing indicator indicating that a network slicing subscription change has occurred, the UE erasing a network slicing configuration for a non-current PLMN that is different than the current PLMN.

7. The method of claim 6, further comprising:
    the UE, prior to receiving the message, transmitting a registration request message for registering with the PLMN, wherein
    the message received from the management function is a registration accept message responsive to the registration request message.

8. The method of claim 6, wherein the message is a configuration update command message.

9. The method of claim 6, wherein
    the network slicing information included in the message comprises: Configured NSSAI for the PLMN, and/or Allowed NSSAI, and
    the management function is an Access and Mobility Management Function (AMF).

10. A non-transitory computer readable medium storing a computer program for configuring a UE to perform the method of claim 6.

11. A user equipment (UE), comprising:
    a receiver for receiving a configuration update command transmitted by a management function within a current Public Land Mobile Network (PLMN); and
    a processor, wherein the UE is configured to:
    determine whether the configuration update command comprises a parameter indicating that a network slicing subscription change has occurred;
    after determining that the configuration update command comprises a parameter indicating that a network slicing subscription change has occurred, initiate a registration procedure; and
    after receiving the configuration update command, erase a network slicing configuration for a non-current PLMN that is different than the current PLMN.

12. The UE of claim 11, wherein
    the configuration update command further comprises: Configured NSSAI for the PLMN, and/or Allowed NSSAI, and
    the management function is an Access and Mobility Management Function (AMF).

13. A user equipment (UE), the UE comprising:
    a receiver for receiving a message transmitted by a management function within a current Public Land Mobile Network (PLMN); and
    processing circuitry, wherein the UE is configured to:
    determine whether the message comprises i) a network slicing indicator indicating that a network slicing subscription change has occurred and ii) network slicing information for the current PLMN;
    after determining that the message comprises i) a network slicing indicator indicating that a network slicing subscription change has occurred and ii) network slicing information for the current PLMN, update a configuration for the current PLMN based on the network slicing information; and
    erase a network slicing configuration for a non-current PLMN that is different than the current PLMN as a result of determining that the message comprises the network slicing indicator indicating that the network slicing subscription change has occurred.

14. The UE of claim 13, further being configured to:
transmit a registration request message for registering with the PLMN, wherein
the message received from the management function is a registration accept message responsive to the registration request message.

15. The UE of claim 13, wherein the message is a configuration update command message.

16. The UE of claim 13, wherein
the network slicing information included in the message comprises: Configured NSSAI for the PLMN and/or Allowed NSSAI, and
the management function is an Access and Mobility Management Function (AMF).

* * * * *

UNITED STATES PATENT AND TRADEMARK OFFICE
CERTIFICATE OF CORRECTION

PATENT NO. : 12,170,955 B2
APPLICATION NO. : 17/845312
DATED : December 17, 2024
INVENTOR(S) : Ramle et al.

Page 1 of 1

It is certified that error appears in the above-identified patent and that said Letters Patent is hereby corrected as shown below:

In the Specification

In Column 1, Line 8, delete "2019 (status pending)," and insert -- 2019, now U.S. Pat. No. 11,388,661, --, therefor.

In Column 8, Line 53, delete "VPLM" and insert -- VPLMN --, therefor.

Signed and Sealed this
Thirtieth Day of December, 2025

John A. Squires
*Director of the United States Patent and Trademark Office*